Patented July 22, 1952

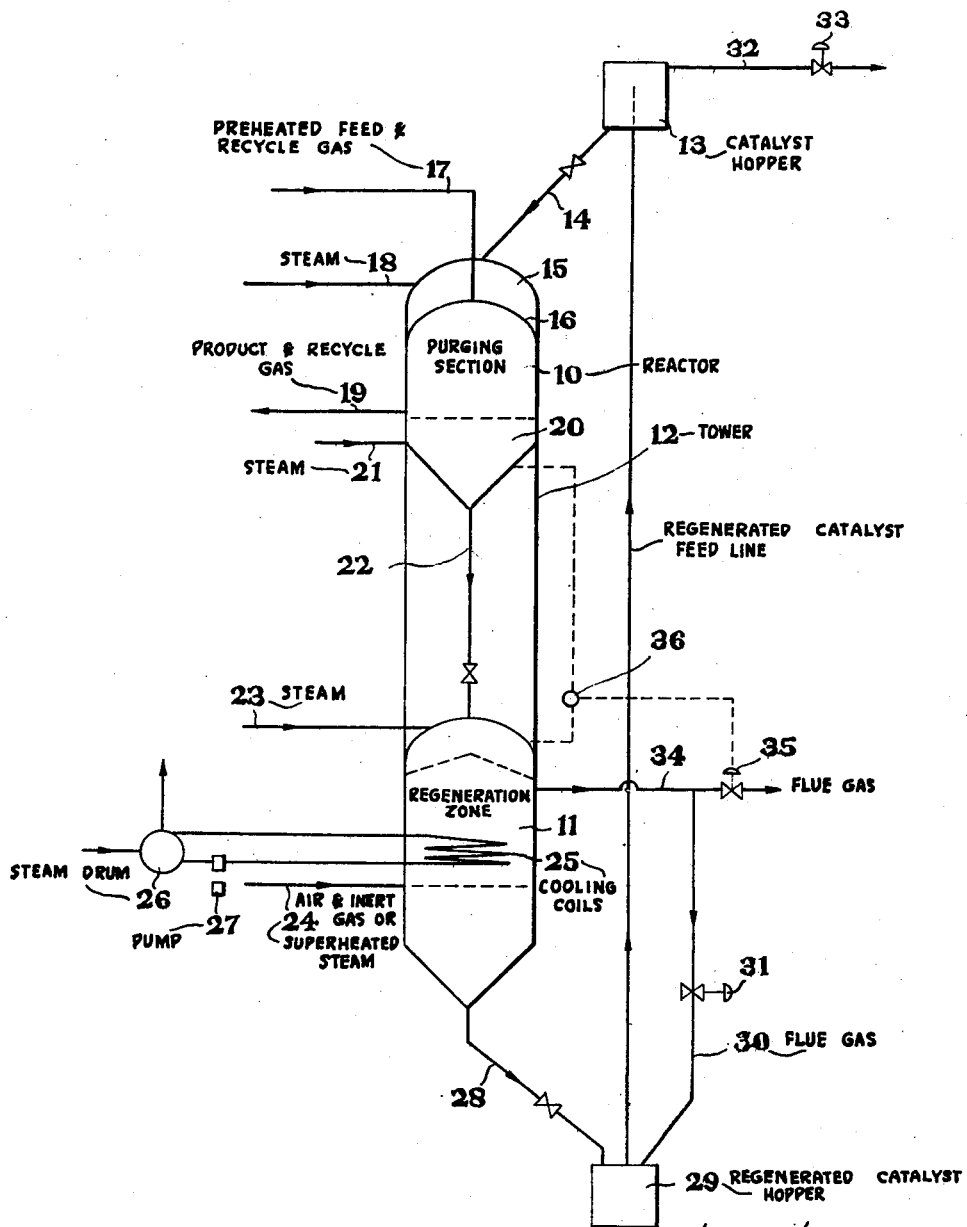

2,604,436

UNITED STATES PATENT OFFICE 2,604,436

CATALYTIC DESULFURIZATION OF PETROLEUM HYDROCARBONS

Stanworth Wills Adey and Frederick William Bertram Porter, Sunbury on Thames, England, assignors to Anglo-Iranian Oil Company Limited, London, England, a British joint-stock corporation Application January 10, 1951, Serial No. 205,402
In Great Britain January 17, 1950

1 Claim. (Cl. 196—28)

This invention relates to the catalytic desulphurisation of petroleum hydrocarbons.

Among the processes which are known for the removal of organically combined sulphur from petroleum hydrocarbons is the so-called hydrofining process in which the petroleum hydrocarbons to be desulphurised are passed in admixture with hydrogen over a sulphur-resistant hydrogenation catalyst at elevated temperature and pressure whereby the organically combined sulphur is converted into hydrogen sulphide which may readily be removed from the treated hydrocarbons the properties of which are not otherwise appreciably affected. This process is technically effective for the removal of organically combined sulphur from petroleum hydrocarbons but is not commercially attractive in view of the cost of supplying the considerable quantity of hydrogen consumed in the process. It was also known that the hydroforming process produced hydrogen and at the same time effected a considerable degree of desulphurisation, but by its very nature this process is not applicable in cases where it is desired to desulphurise feedstocks, such as gas oils and aromatic extracts, without appreciably affecting the properties of the feedstock other than changes consequent upon the removal of the organically combined sulphur as hydrogen sulphide. Desulphurisation processes are also known in which a substance capable of supplying hydrogen under the conditions of the desulphurisation reaction is added to the feedstock to be desulphurised, but this is only a special case of hydrofining and suffers from the disadvantage of the cost of supplying the hydrogen donor and from the additional disadvantage that the through-put of the feedstock is reduced by the addition of the considerable quantity of hydrogen donor necessary to supply sufficient hydrogen.

It was then discovered that by careful control of the temperature and pressure and by using a sufficiently active dehydrogenation-hydrogenation catalyst, it was possible to derive sufficient hydrogen by dehydrogenation of napthenes contained in the feedstock to enable sufficient of the organically combined sulphur in the feedstock to be converted into hydrogen sulphide, under the same temperature and pressure conditions, to constitute an effective desulphurisation process. This process has been called "autofining" and it has the considerable advantage as compared with hydrofining that all the hydrogen required for desulphurisation is derived from the feedstock itself. It was surprising to find that conditions existed under which the two reactions of dehydrogenation of naphthenes and hydrogenation of organic sulphur compounds could proceed simultaneously to the extent necessary to provide a satisfactory catalytic desulphurisation process. The process was found to be applicable to a wide variety of feedstocks ranging from naphthas to wax distillates under the following set of conditions:

| | | |
|---|---|---|
| Pressure | p. s. i. g. | 50–200 |
| Temperature | °F. | 750–800 |
| Space velocity | v./v./hr. | 1.0–5.0 |
| Recycle rate | CF/B | 2000–4000 |

The preferred catalyst for use in the autofining process is of the so-called cobalt molybdate type which comprises mixtures of the oxides of cobalt and molybdenum, or chemical compounds of cobalt, molybdenum and oxygen, or mixtures of one or both of said oxides with said compounds either alone or incorporated with a support. It has been found that there is a period at the commencement of each run during which the gas make is negligible or non-existent and the desulphurisation is not at its maximum. This low dehydrogenating activity of the catalyst is more noticeable at low feedstock velocities and with the heavier feedstocks. It was discovered that the non-activity of the catalyst during the early hours on stream could be largely overcome by subjecting the catalyst to the action of hydrogen sulphide or hydrogen sulphide-containing gas prior to its use in the autofining process.

The regeneration of the used catalyst may be carried out by burning off the carbon and sulphur deposits with either a nitrogen/air or steam/air mixture. The following conditions may be employed for regeneration.

| | | |
|---|---|---|
| Inlet temperature | °F. | 800–850 |
| Steam or nitrogen flow | v./v./hr. | 700–900 |
| Air flow | v./v./hr. | 50–60 |
| Inlet oxygen | Percent mol | 1 to 1.5 |

The inlet oxygen concentration is controlled to keep the catalyst bed temperature below 1100° F. Regeneration restores the activity of the catalyst completely and it has been found that a large number of regenerations has no effect on the activity or properties of the catalyst.

The autofining process may be operated by setting the pressure in the autofining zone at a predetermined level and thereafter withdrawing from the system gas in excess of that required to maintain the predetermined pressure. In this case, there is a continuous make of hydrogen indicating that the hydrogen produced in the dehydrogenation reaction is not being fully utilised in the desulphurisation reaction. An improved method of operation was therefore developed in which the hydrogen-containing gaseous fraction is recycled to the reaction zone and the pressure therein allowed to rise to an equilibrium pressure at which the hydrogen evolved equals the hydrogen consumed. This method of operation results in a greater degree of desulphurisation and increased on-stream hours for a product of given sulphur content.

The autofining process has hitherto been carried out in a static bed reactor but this method of operation has not proved entirely satisfactory when treating higher boiling distillates, such as waxy distillate, inasmuch as the on-stream hours for effective desulphurisation are comparatively small and a comparatively rapid decline in catalyst activity takes place. The disadvantage of decline in catalyst activity also occurs when treating other feedstocks such as gas oils and aromatic extracts although in this case the decline in activity is not so marked and upwards of 200 hours operation are possible before the extent of desulphurisation falls below what is considered to be an economic level. Also the product obtained when operating with a static bed type reactor increases in sulphur content as the degree of desulphurisation falls off thereby requiring large storage and blending capacity.

The principal object of the present invention is to provide a method of carrying out the autofining process in which the above stated disadvantages are avoided.

It has now been discovered that the moving catalyst bed technique can be successfully applied to the autofining process.

According to the invention therefore an autofining process is carried out using a granular or pelletted catalyst that flows downwardly in the reactor by gravity and forms a solid moving bed of catalyst therein, catalyst being continuously withdrawn from the reactor, regenerated, and returned to the reactor.

By an autofining process is meant a process in which a petroleum feedstock is passed in vapour form in admixture with hydrogen over a catalyst which combines activity for the dehydrogenation of naphthenes to aromatics with activity for the hydrogenation of organic sulphur compounds and which is not poisoned as a catalyst by the presence of sulphur compounds, under conditions of temperature and pressure such that dehydrogenation of naphthenes contained in the feed stock is effected to an extent not substantially in excess of that required to produce sufficient hydrogen to convert organically combined sulphur in the fraction into hydrogen sulphide and to maintain the pressure in the reaction zone, the hydrogen and hydrogen sulphide being separated from the treated feedstock and the hydrogen recycled to the reaction zone as the sole source of hydrogen to said zone.

A particularly suitable catalyst for use in the moving catalyst bed process according to the invention consists of cobalt molybdate on alumina.

One method of carrying the invention into effect will now be described with reference to the accompanying diagrammatic drawing.

The apparatus in which the process is carried out consists of a reactor 10 and a regenerator 11 which may be built into a single tower 12. Catalyst is fed by gravity from an upper catalyst hopper 13 via line 14 into the catalyst distributing head 15 which comprises a catalyst feed tray 16. The preheated feed and recycle gas are fed into the reactor just below the tray 16 via line 17. The recycle gas is in sufficient quantity to maintain total vapour phase. A small quantity of steam is injected into the top of the reactor via line 18 to seal the catalyst feed line 14 and prevent the escape of hydrocarbons and recycle gas into the hopper 13. The feed and catalyst pass concurrently downward through the reaction zone, the product and recycle gas passing out via line 19 to a cooler and separator.

The spent catalyst passes through a purging section 20, where residual hydrocarbons are stripped off by means of steam introduced via line 21, and is fed by gravity through line 22 into the regenerator 11. A steam seal is maintained at the top of the regenerator via line 23 to prevent the regeneration gases escaping up the catalyst line 22 into the reactor. Air and inert gas or superheated steam are injected into the regenerator via line 24 whereby the carbon and sulphur deposits are burnt off the catalyst. Temperatures are controlled by varying the air flow and also by means, where necessary, of a cooling system comprising cooling coils 25 located within the regenerator, a steam drum 26 and pump 27.

The regenerated catalyst flows by gravity from the base of the regenerator through a seal leg 28 to a lower catalyst hopper 29. Here the catalyst is picked up by a stream of flue gas introduced into the hopper 29 via line 30 and flow controller 31, and lifted to the upper catalyst hopper 13, from which the flue gas is vented via line 32 and flow controller 33, the catalyst being fed back into the reactor. The flue gas leaving the regenerator via line 34 is split into two streams, one stream passing via line 30 and flow controller 31 into the lower catalyst hopper 29, and the other stream passing to vent via a pressure controller 35 positioned by a differential pressure recorder 36 connected to the reactor and regenerator.

The whole of the plant operates at approximately reaction pressure.

The results obtained in treating a wax distillate of Iranian origin by the moving bed process of this invention are set out in the following Table I.

Table I

| | |
|---|---|
| Reactor Pressure | 100 p. s. i. g. |
| Reactor Temperature | 780° F. |
| Space Velocity | $0.4 \frac{\text{wt. of oil/hr.}}{\text{wt. of catalyst charge in reactor}}$ |
| Catalyst/Oil Ratio | 0.25. |
| Gas Recycle Rate | 5000 CF/B. |
| Sulphur in Feed Percent Weight | 1.72. |
| Sulphur in Product Percent Weight | 0.75. |
| Sulphur Removal | 56%. |

The results obtained by treating a gas oil of Iranian origin by the moving bed process of this invention are set out in the following Table II.

Table II

| | |
|---|---|
| Pressure (Reactor) | } 100 p. s. i. g. |
| Pressure (Regenerator) | |
| Reactor Temperature | 780° F. |
| Space Velocity | $1.8 \frac{\text{wt. of oil/hr.}}{\text{wt. of catalyst charge in reactor}}$ |
| Catalyst/Oil Ratio | 0.03. |
| Gas Recycle Rate | 2000 CF/B. |
| Sulphur in Feed Percent Weight | 1.0. |
| Sulphur in Product Percent Weight | 0.35. |
| Sulphur Removal | 65%. |

Aromatic extracts and all other feedstocks boiling up to about 350° C. can be treated under the conditions disclosed above for the treatment of gas oil.

There are several advantages to be gained by the use of the moving bed catalyst process as compared with the fixed bed process, among which are the following:

1. The desulphurisation process is continuous.
2. A constant high level of desulphurisation is possible.
3. The process has all the usual advantages of a moving bed catalyst process such as obviating the expensive equipment for changing over to regeneration at frequent intervals, and better temperature control during reaction, and more especially during regeneration.
4. By increasing the catalyst to oil ratio or by decreasing the space velocity or by a combination of both, it is possible to obtain gas oils of very low sulphur content of the order of about 0.1% by weight.

We claim:

In a process for the hydrocatalytic desulphurization of a sulphur-and-naphthene containing petroleum fraction boiling at least in the boiling range of wax distillates wherein the fraction is passed in vapor form to a reaction zone wherein it is contacted in the presence of hydrogen and at elevated temperatures and pressure with a granular dehydrogenation-hydrogenation catalyst consisting essentially of the combined oxides of cobalt and molybdenum and which is immune to sulphur poisoning and combines activity for the dehydrogenation of naphthenes to aromatics with activity for the hydrogenation of organically combined sulphur in the fraction to hydrogen sulphide and wherein the treated fraction is removed from the reaction zone and the hydrogen sulphide subsequently removed therefrom; the method of operating the process so that it will be self-supporting with respect to the amount of hydrogen needed and increase the amount of on-stream hours for effective desulphurization and increase the activity life of said catalyst, comprising the steps of passing the fraction in vapor form at a space velocity of 1.0–5.0 v./v./hr. through said reaction zone and contacting the fraction therein with said granular catalyst and with hydrogen derived solely from the oil, said catalyst forming a solid moving bed in said zone, maintaining a selected temperature in said zone between about 750–800° F. at which hydrogen is produced continuously from said fraction, maintaining a selected pressure in said zone between about 50–200 lb./sq. in., said selected temperature and pressure being correlated to effect the dehydrogenation of naphthenes contained in the fraction to an extent not substantially in excess of that required to produce sufficient hydrogen to convert the organically combined sulphur into hydrogen sulphide and to maintain the pressure in the reaction zone, continuously removing treated hydrocarbons from the reaction zone, cooling said treated hydrocarbons under the reaction pressure to effect a condensation of the hydrocarbons to a liquid form and in which the bulk of the hydrogen sulphide formed in the reaction zone is dissolved, separating a hydrogen-rich gas from said liquid hydrocarbons, recycling said hydrogen-rich gas to the reaction zone at the rate of 2000–4000 CF/B to constitute the whole of the hydrogen supplied to said reaction zone, continuously removing the spent catalyst from the reaction zone, passing the spent catalyst to a regeneration zone, returning the regenerated catalyst from said regeneration zone to said reaction zone, and removing hydrogen sulphide from the condensed liquid hydrocarbon.

STANWORTH WILLS ADEY.
FREDERICK WILLIAM BERTRAM PORTER.

REFERENCES CITED

The following references are of record in the file of this patent:

UNITED STATES PATENTS

| Number | Name | Date |
|---|---|---|
| 2,393,288 | Byrns | Jan. 22, 1946 |
| 2,417,308 | Lee | Mar. 11, 1947 |
| 2,436,340 | Upham et al. | Feb. 17, 1948 |
| 2,461,069 | Marisic et al. | Feb. 8, 1949 |
| 2,487,466 | Nahin | Nov. 8, 1949 |
| 2,500,146 | Fleck | Mar. 14, 1950 |